United States Patent
Chang

(10) Patent No.: US 6,907,903 B1
(45) Date of Patent: Jun. 21, 2005

(54) DRIVE SHAFT FOR CERAMIC CONTROL VALVE OF FAUCET

(75) Inventor: Chia-Po Chang, Changhua Hsien (TW)

(73) Assignee: Hain Yo Enterprises Co., Ltd., Changhua Hsien (TW)

( * ) Notice: Subject to any disclaimer, the term of this patent is extended or adjusted under 35 U.S.C. 154(b) by 0 days.

(21) Appl. No.: 10/829,109

(22) Filed: Apr. 21, 2004

(51) Int. Cl.[7] .......................................... F16K 11/078
(52) U.S. Cl. .............................. 137/636.3; 137/625.17
(58) Field of Search ............. 137/636.3, 625.4–625.41

(56) References Cited

U.S. PATENT DOCUMENTS

| | | | | |
|---|---|---|---|---|
| 3,324,884 A | * | 6/1967 | Dornaus | ................ 137/625.17 |
| 3,854,493 A | * | 12/1974 | Farrell | ........................ 137/360 |
| 4,325,403 A | * | 4/1982 | Uhlmann | ................ 137/315.11 |
| 4,596,376 A | * | 6/1986 | Knapp | ........................ 251/127 |
| 4,705,072 A | * | 11/1987 | Egli | ....................... 137/625.17 |
| 5,490,540 A | * | 2/1996 | Vom Dahl et al. | ...... 137/625.17 |
| 5,730,176 A | * | 3/1998 | Heimann et al. | ........... 137/359 |

* cited by examiner

Primary Examiner—Paul J. Hirsch
(74) Attorney, Agent, or Firm—Alan D. Kamrath; Nikolai & Mersereau, P.A.

(57) ABSTRACT

A faucet includes a main body, a control valve, a drive shaft, and a handle. The drive member of the drive shaft has a peripheral wall contacting with the mounting recess of the control seat of the control valve and formed with a plurality of spacing portions to reduce a contacting area between the drive member and the mounting recess to prevent the drive member from being expanded excessively due to absorbing the water to jam the mounting recess, so that the drive shaft is operated easily and conveniently, thereby facilitating the user operating the faucet.

8 Claims, 7 Drawing Sheets

DRIVE SHAFT FOR CERAMIC CONTROL VALVE OF FAUCET

BACKGROUND OF THE INVENTION

1. Field of the Invention

The present invention relates to a drive shaft for a ceramic control valve of a faucet, and more particularly to a faucet having a drive shaft that is operated easily and conveniently, thereby facilitating the user operating the faucet.

2. Description of the Related Art

A conventional faucet in accordance with the prior art is disclosed in the Taiwanese Patent Publication No. 528133 and comprises a main body, a control valve mounted in the main body and having a top formed with a control seat formed with a circular mounting recess, a drive shaft rotatably mounted on the main body and having a lower portion formed with a spherical drive member mounted in the mounting recess of the control seat of the control valve to rotate the control valve, and a handle fixed on an upper portion of the drive shaft to rotate the drive shaft. Preferably, the drive shaft is made of composite material of a nylon mixed fiber. In operation, when the handle is rotated by a user, the drive shaft is rotated by the handle to rotate the control seat of the control valve to open and close the water flow and to control the flow rate of the water flow.

However, the drive shaft made of composite material of a nylon mixed fiber is easily expanded due to absorbing the water contained in the faucet, so that the drive member of the drive shaft is close fit with the mounting recess of the control seat of the control valve to jam the mounting recess. Thus, the drive shaft cannot be operated easily and conveniently, thereby causing inconvenience to the user when operating the faucet.

SUMMARY OF THE INVENTION

The primary objective of the present invention is to provide a drive shaft for a ceramic control valve of a faucet.

Another objective of the present invention is to provide a faucet, wherein the peripheral wall of the drive member of the drive shaft is formed with a plurality of flattened edges, concave portions or protruding portions.

A further objective of the present invention is to provide a faucet, wherein by provision of the flattened edges, the concave portions or the protruding portions on the peripheral wall of the drive member of the drive shaft, the contacting and rubbing area between the drive member of the drive shaft and the mounting recess of the control seat of the control valve is greatly reduced, so as to prevent the drive member of the drive shaft from being expanded excessively due to absorbing the water to jam the mounting recess of the control seat of the control valve, so that the drive shaft is operated easily and conveniently, thereby facilitating the user operating the faucet.

In accordance with the present invention, there is provided a faucet, comprising a main body, a control valve mounted in the main body and having a top formed with a control seat having a center formed with a circular mounting recess, a drive shaft rotatably mounted on the main body and having a lower portion formed with a drive member mounted in the mounting recess of the control seat of the control valve to rotate the control valve, and a handle fixed on an upper portion of the drive shaft to rotate the drive shaft, wherein:

the drive member of the drive shaft has a peripheral wall contacting with the mounting recess of the control seat of the control valve;

the peripheral wall of the drive member of the drive shaft is formed with a plurality of spacing portions to reduce a contacting area between the drive member of the drive shaft and the mounting recess of the control seat of the control valve.

Further benefits and advantages of the present invention will become apparent after a careful reading of the detailed description with appropriate reference to the accompanying drawings.

DETAILED DESCRIPTION OF THE INVENTION

Figure 1:
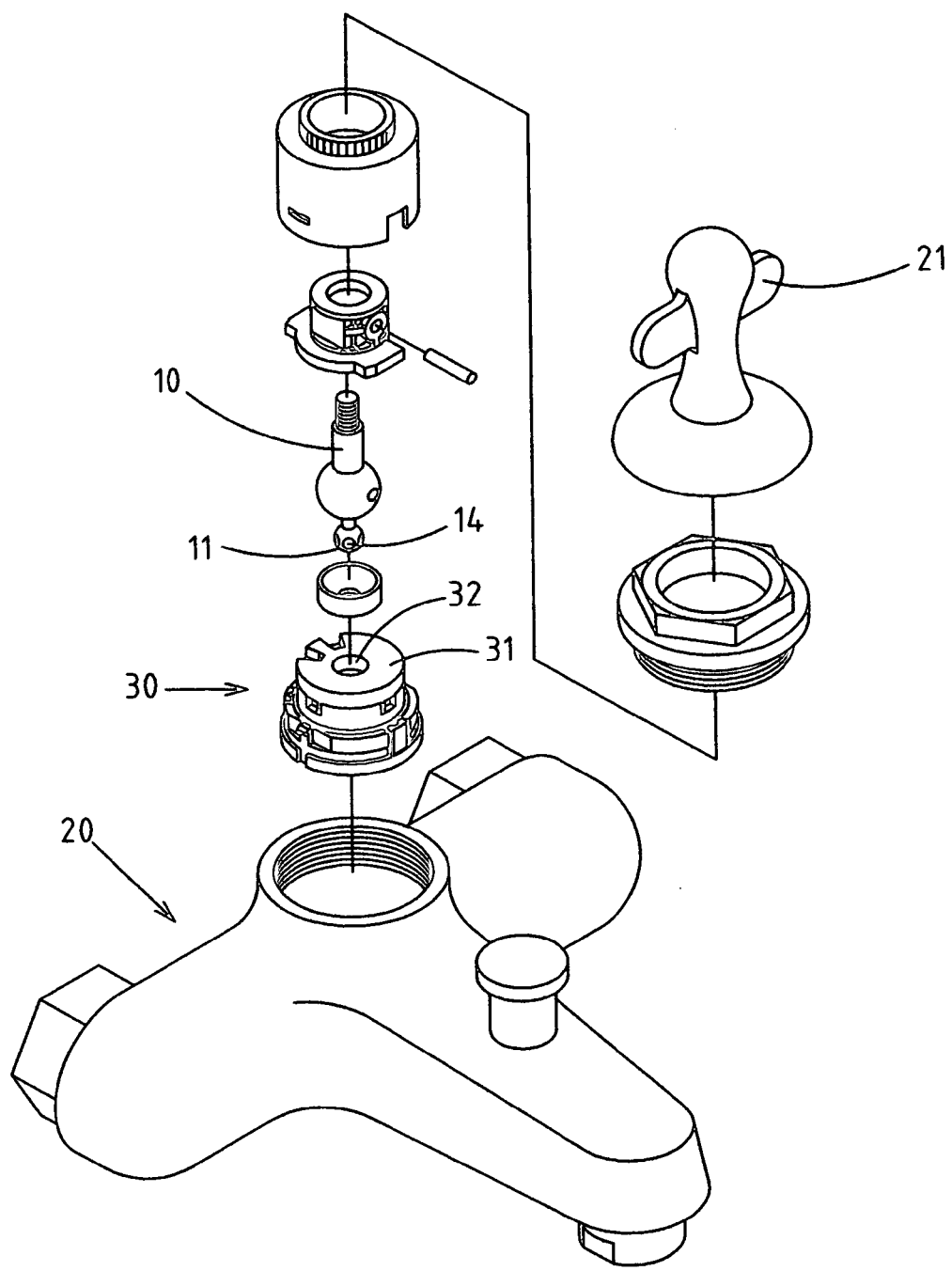
FIG. 1 is an exploded perspective view of a faucet in accordance with the preferred embodiment of the present invention.
Figure 2:
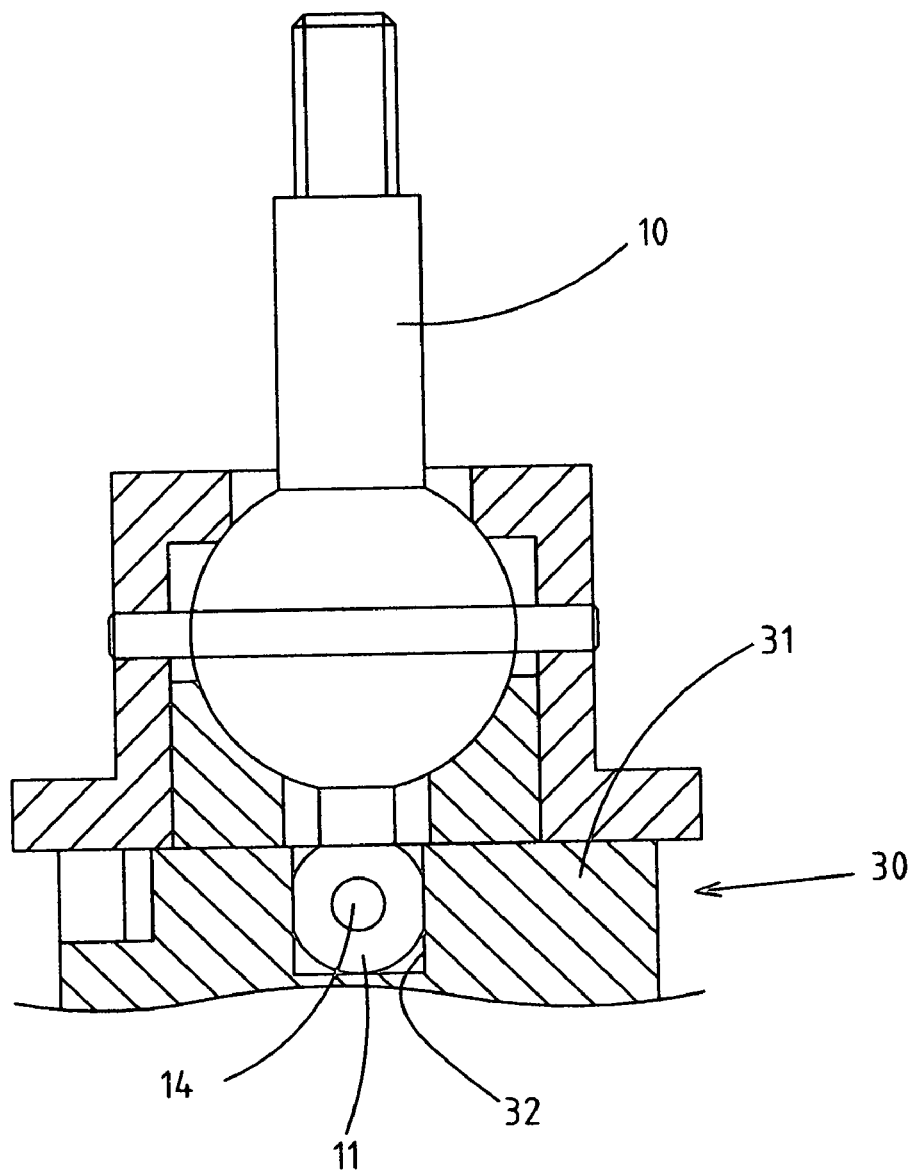
FIG. 2 is a partially cut-away side plan cross-sectional assembly view of the faucet as shown in FIG. 1.
Figure 3:
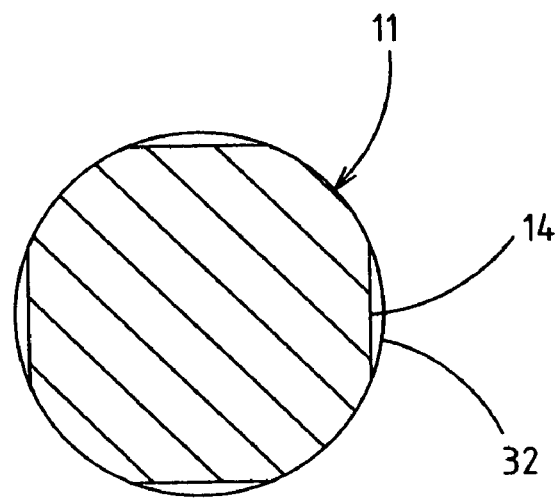
FIG. 3 is a partially cut-away top plan cross-sectional assembly view of the faucet as shown in FIG. 1.

Referring to the drawings and initially to FIGS. 1–3, a faucet in accordance with the preferred embodiment of the present invention comprises a main body 20, a ceramic control valve 30 mounted in the main body 20 and having a top formed with a control seat 31 having a center formed with a circular mounting recess 32, a drive shaft 10 rotatably mounted on the main body 20 and having a lower portion formed with a spherical drive member 11 mounted in the mounting recess 32 of the control seat 31 of the control valve 30 to rotate the control valve 30, and a handle 21 fixed on an upper portion of the drive shaft 10 in a screw member to rotate the drive shaft 10. Preferably, the drive shaft 10 is made of composite material of a nylon mixed fiber and has an upright column shape. In operation, when the handle 21 is rotated by a user, the drive shaft 10 is rotated by the handle 21 to rotate the control seat 31 of the control valve 30 to open and close the water flow and to control the flow rate of the water flow.

As shown in FIG. 3, the drive member 11 of the drive shaft 10 has a peripheral wall contacting with the mounting recess 32 of the control seat 31 of the control valve 30, and the peripheral wall of the drive member 11 of the drive shaft 10 is formed with a plurality of flattened edges 14 which are spaced from each other and are arranged in a staggered manner. Thus, by provision of the flattened edges 14 on the peripheral wall of the drive member 11 of the drive shaft 10, the contacting and rubbing area between the drive member 11 of the drive shaft 10 and the mounting recess 32 of the control seat 31 of the control valve 30 is greatly reduced.

Figure 4:
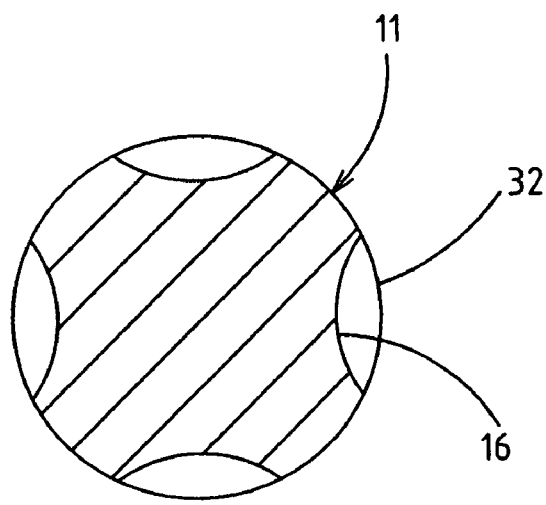
FIG. 4 is a partially cut-away top plan cross-sectional assembly view of a faucet in accordance with another embodiment of the present invention.

As shown in FIG. 4, the peripheral wall of the drive member 11 of the drive shaft 10 is formed with a plurality of arcuate concave portions 16 which are spaced from each other and are arranged in a staggered manner. Thus, by provision of the arcuate concave portions 16 on the peripheral wall of the drive member 11 of the drive shaft 10, the contacting and rubbing area between the drive member 11 of the drive shaft 10 and the mounting recess 32 of the control seat 31 of the control valve 30 is greatly reduced.

Figure 5:
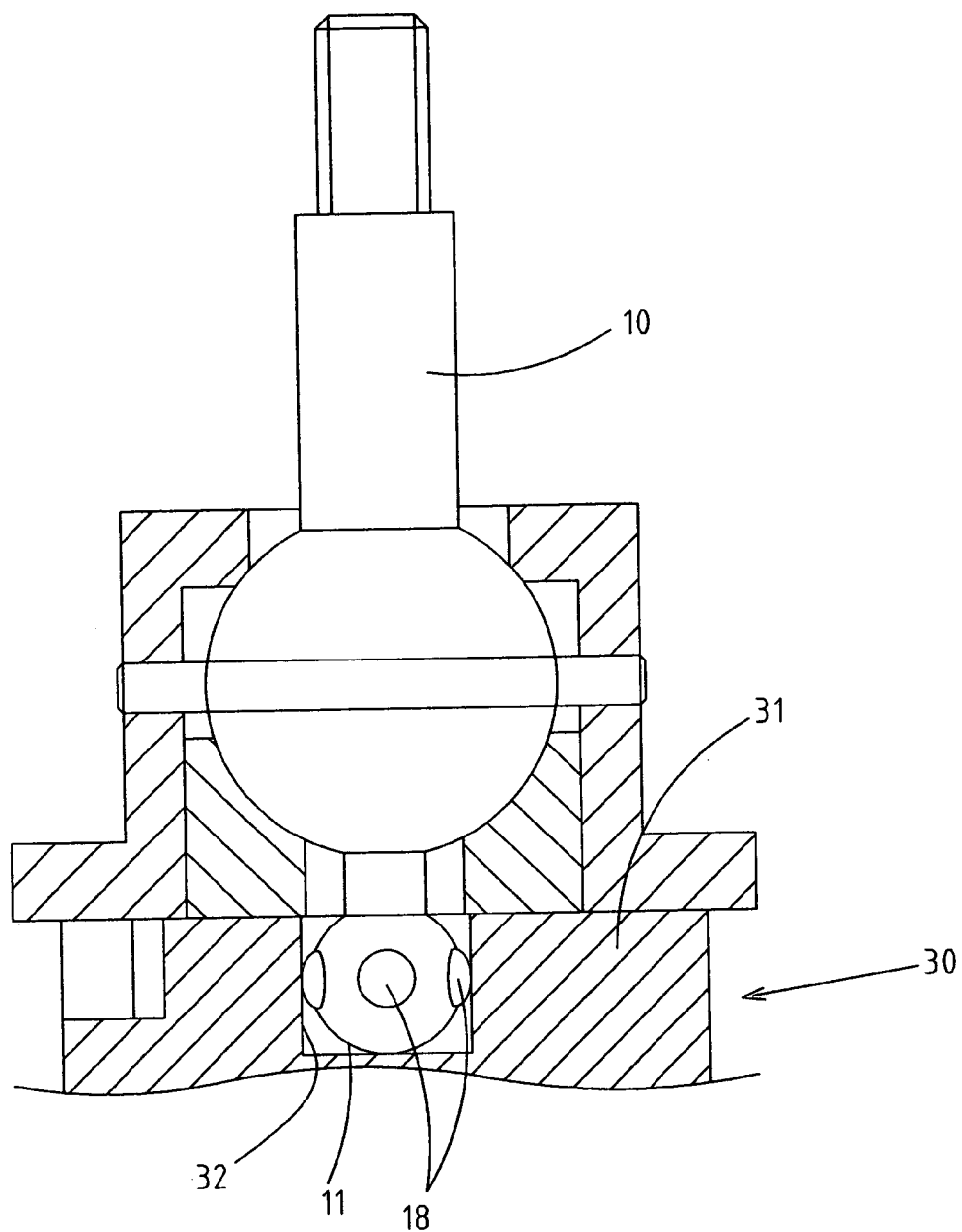
FIG. 5 is a partially cut-away side plan cross-sectional assembly view of a faucet in accordance with another embodiment of the present invention.
Figure 6:
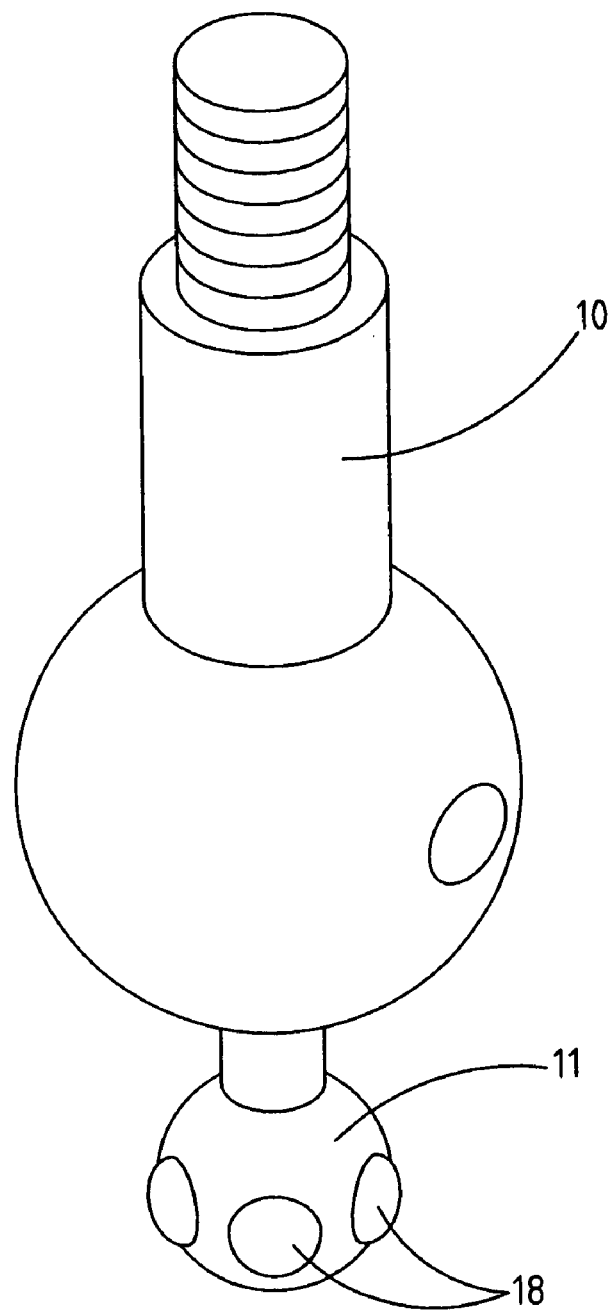
FIG. 6 is a perspective view of a drive shaft of the faucet as shown in FIG. 5.

As shown in FIGS. 5 and 6, the peripheral wall of the drive member 11 of the drive shaft 10 is formed with a plurality of semi-circular protruding portions 18 which are spaced from each other and are arranged in a staggered manner. Thus, by provision of the semi-spherical protruding portions 18 on the peripheral wall of the drive member 11 of the drive shaft 10, the contacting and rubbing area between the drive member 11 of the drive shaft 10 and the mounting recess 32 of the control seat 31 of the control valve 30 is greatly reduced.

Figure 7:
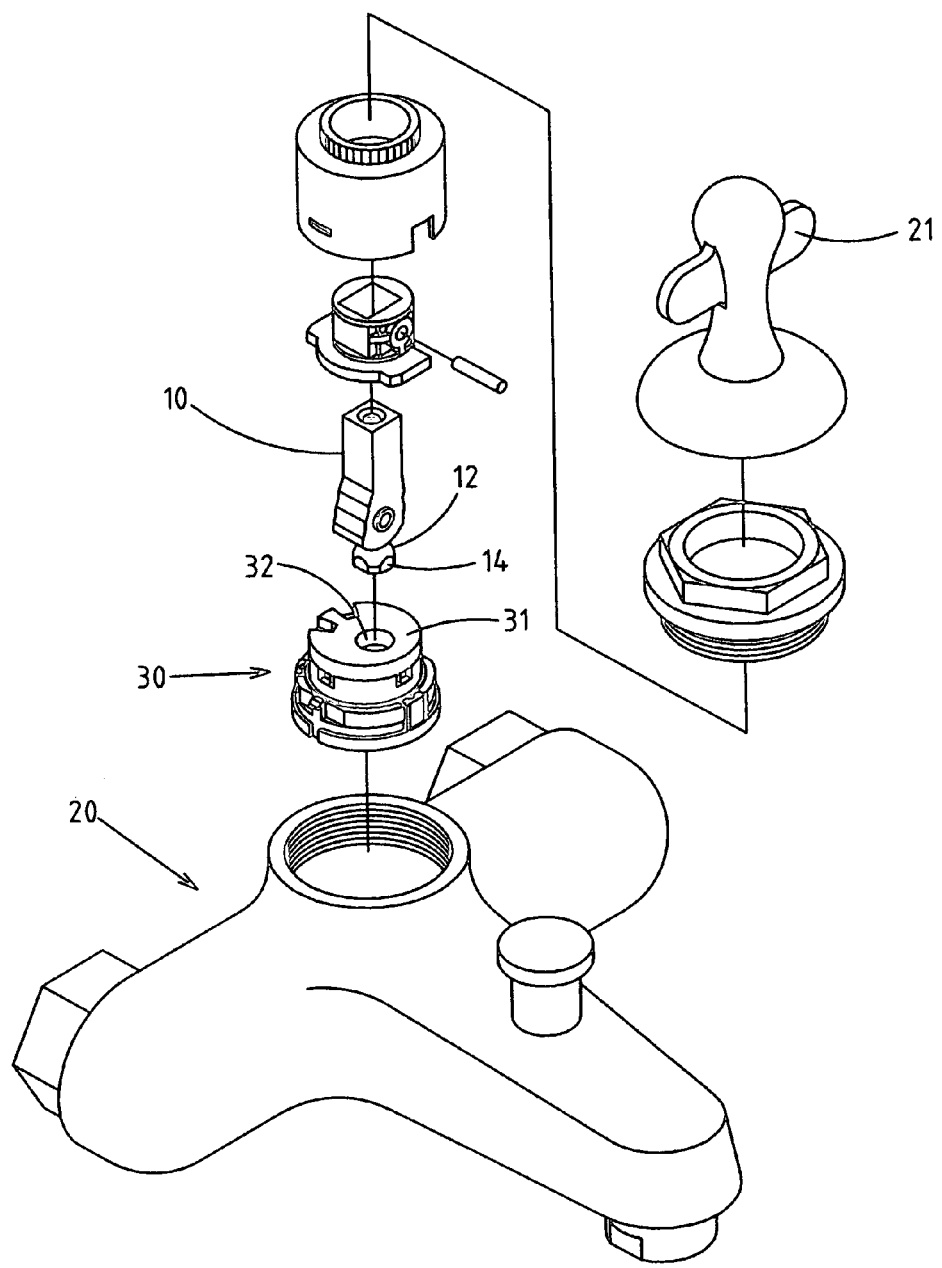
FIG. 7 is an exploded perspective view of a faucet in accordance with another embodiment of the present invention.
Figure 8:
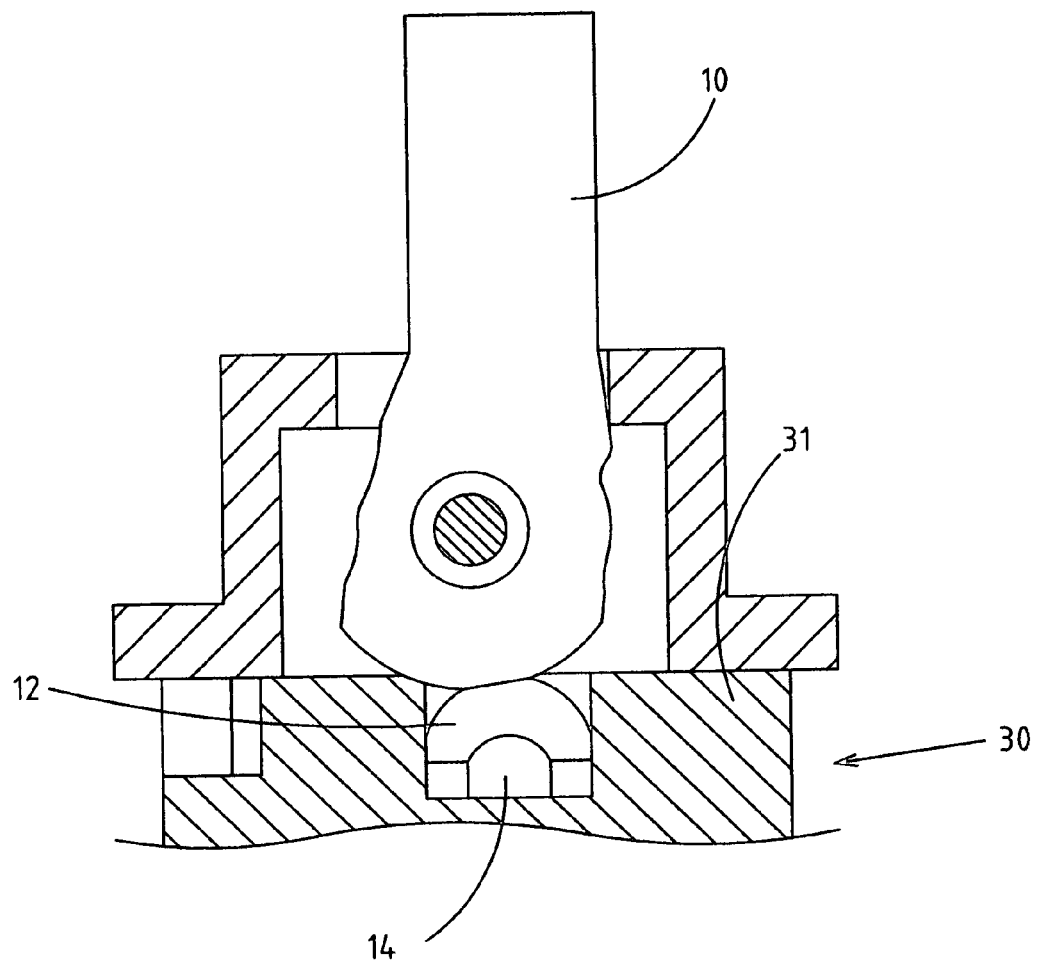
FIG. 8 is a partially cut-away side plan cross-sectional assembly view of the faucet as shown in FIG. 7.

As shown in FIGS. 7 and 8, the drive member 12 of the drive shaft 10 has a semi-spherical shape, and the peripheral wall of the drive member 12 of the drive shaft 10 is formed with a plurality of flattened edges 14 which are spaced from each other and are arranged in a staggered manner.

Accordingly, by provision of the flattened edges 14, the concave portions 16 or the protruding portions 18 on the peripheral wall of the drive member 11 of the drive shaft 10, the contacting and rubbing area between the drive member 11 of the drive shaft 10 and the mounting recess 32 of the control seat 31 of the control valve 30 is greatly reduced, so as to prevent the drive member 11 of the drive shaft 10 from being expanded excessively due to absorbing the water to jam the mounting recess 32 of the control seat 31 of the control valve 30, so that the drive shaft 10 is operated easily and conveniently, thereby facilitating the user operating the faucet.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A faucet, comprising a main body, a control valve mounted in the main body and having a top formed with a control seat having a center formed with a circular mounting recess, a drive shaft rotatably mounted on the main body and having a lower portion formed with a drive member mounted in the mounting recess of the control seat of the control valve to rotate the control valve, and a handle fixed on an upper portion of the drive shaft to rotate the drive shaft, wherein:

the drive member of the drive shaft has a peripheral wall contacting with the mounting recess of the control seat of the control valve;

the peripheral wall of the drive member of the drive shaft is formed with a plurality of spacing portions to reduce a contacting area between the drive member of the drive shaft and the mounting recess of the control seat of the control valve.

2. The faucet in accordance with claim 1, wherein the spacing portions of the drive member of the drive shaft are spaced from each other.

3. The faucet in accordance with claim 1, wherein the spacing portions of the drive member of the drive shaft are arranged in a staggered manner.

4. The faucet in accordance with claim 1, wherein the drive member of the drive shaft has a spherical shape.

5. The faucet in accordance with claim 1, wherein the drive member of the drive shaft has a semi-spherical shape.

6. The faucet in accordance with claim 1, wherein the spacing portions of the drive member of the drive shaft are flattened edges.

7. The faucet in accordance with claim 1, wherein the spacing portions of the drive member of the drive shaft are arcuate concave portions.

8. The faucet in accordance with claim 1, wherein the spacing portions of the drive member of the drive shaft are semi-circular protruding portions.

* * * * *